(12) United States Patent
Shinsato

(10) Patent No.: US 9,767,856 B2
(45) Date of Patent: Sep. 19, 2017

(54) HIGH DENSITY STORAGE DEVICE SYSTEM

(71) Applicant: NetApp Inc., Sunnyvale, CA (US)

(72) Inventor: Macen Shinsato, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 117 days.

(21) Appl. No.: 14/618,637

(22) Filed: Feb. 10, 2015

(65) Prior Publication Data

US 2016/0234962 A1 Aug. 11, 2016

(51) Int. Cl.
*H05K 5/00* (2006.01)
*G11B 33/12* (2006.01)

(52) U.S. Cl.
CPC .................................. *G11B 33/128* (2013.01)

(58) Field of Classification Search
None
See application file for complete search history.

(56) References Cited

U.S. PATENT DOCUMENTS

| 7,312,999 | B1 | 12/2007 | Miyamura et al. | |
|---|---|---|---|---|
| 2005/0257232 | A1* | 11/2005 | Hidaka | G11B 33/126 720/654 |
| 2009/0273896 | A1* | 11/2009 | Walker | G06F 1/187 361/679.33 |
| 2016/0095246 | A1* | 3/2016 | Noland | H05K 7/1489 361/679.31 |

OTHER PUBLICATIONS

Dot Hill Systems Corporation, "Ultra48™—AssuredSan® 4004 Models," 2014 Copyright Dot Hill Systems Corporation, Oct. 30, 2014, 4 pgs.

* cited by examiner

*Primary Examiner* — Courtney Smith
*Assistant Examiner* — Rashen E Morrison
(74) *Attorney, Agent, or Firm* — Haynes and Boone, LLP; Thomas W. Kelton

(57) ABSTRACT

The present disclosure provides a chassis housing an increased density of smaller storage devices. The chassis houses one or more power supplies, one or more input/output modules, and hot swappable, front accessible field replaceable units. The field replaceable units have a depth that is greater than their width and height, so as to accommodate dual storage devices one in front of the other. The proximal storage device connects to a midplane of the chassis via an interposer card situated between the proximal and distal storage devices. The interposer card conditions any signals that exhibit signal integrity problems after traversing between the midplane and the interposer card. The interposer card connects to the midplane via a bridge card and a flexible connector running underneath the distal storage device. Each field replaceable unit is placed into the front end of the chassis in a vertical orientation with respect to the chassis.

15 Claims, 8 Drawing Sheets

HIGH DENSITY STORAGE DEVICE SYSTEM

TECHNICAL FIELD

The present description relates to data storage systems and, more specifically, to high-density rack mountable storage system enclosures.

BACKGROUND

Networks and distributed storage allow data and storage space to be shared between devices located anywhere a connection is available. Improvements in capacity and network speeds have enabled a move away from locally attached storage devices and towards centralized storage repositories such as cloud-based data storage. These centralized offerings deliver the promised advantages of security, worldwide accessibility, and data redundancy. To provide these services, storage systems may incorporate Network Attached Storage (NAS) devices, Storage Area Network (SAN) devices, and other configurations of storage elements and controllers in order to provide data and manage its flow.

These centralized offerings are often physically located together in a server rack or similar enclosure that utilizes a high density architecture. As storage devices, such as hard drives, have become smaller in size while larger in capacity, new chassis designs have become necessary in order to provide increased hard drive density within a given enclosure. The chassis design has an impact on the way in which air (and/or other gas) circulates throughout to cool the storage devices housed within, as well as how well data is conveyed between storage devices and storage controller(s). Some approaches have sought to mount one storage device in front of another in a drive module. As storage devices continue to shrink in size, however, challenges arise in delivering power and signals to and from the front storage device around the rear storage device without impinging on the airflow between the storage device modules in order to adequately cool the storage devices, the power supply(ies), and input/output module(s).

As storage device sizes continue to decrease and it becomes desirable to include more within a chassis that also takes up less space in an enclosure (such as a server rack), there exists a need for architectures that meet these needs for increased data storage density without sacrificing thermal performance or service accessibility.

BRIEF DESCRIPTION OF THE DRAWINGS

The present disclosure is best understood from the following detailed description when read with the accompanying figures.

DETAILED DESCRIPTION

Figure 1A:
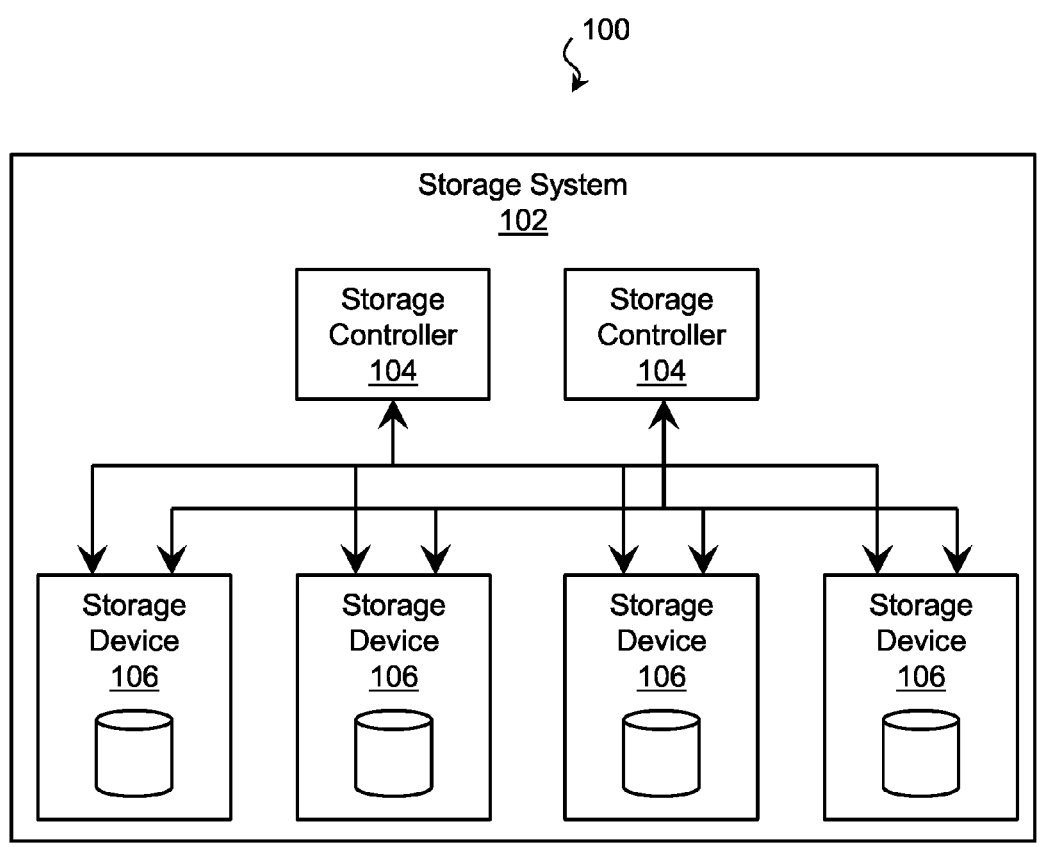
FIG. 1A is a schematic diagram of an exemplary storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments except where explicitly noted. Finally, in view of this disclosure, particular features described in relation to one aspect or embodiment may be applied to other disclosed aspects or embodiments of the disclosure, even though not specifically shown in the drawings or described in the text.

Various embodiments include systems and chassis for housing an increased density of smaller storage devices in a reduced vertical profile without sacrificing thermal performance or service accessibility. In an example, a storage chassis has a standard rack width and a reduced height (e.g., 2U). The storage chassis may house dual redundant, hot swappable, tool-less removable, rear accessible power supplies at a distal end of the storage chassis; dual redundant, hot swappable, tool-less removable, rear accessible input/output (or controller) modules; and a plurality of hot swappable, tool-less removable, front accessible storage device modules (referred to herein as field replaceable units).

The field replaceable units, according to the example, have a depth that is greater than their width and height, so as to accommodate dual storage devices one in front of the other. The proximal storage device may connect to a midplane of the chassis via an interposer card situated between the proximal and distal storage devices. The interposer card may condition (e.g., boost) any signals that exhibit signal integrity problems after traversing the distance between the midplane and the interposer card. The interposer card is connected to the midplane via a bridge card and a flexible connector that runs underneath the distal storage device. The connector is flexible so that it may occupy less space within the field replaceable units and therefore allow for a smaller pitch between field replaceable units within a storage device enclosure at the front end of the chassis. Each field replaceable unit is placed into the storage device enclosure in a vertical orientation with respect to the chassis. As a result, each field replaceable unit may be placed adjacent to each other within the storage device enclosure along a horizontal axis of the chassis. By placing the field replaceable units into the storage device enclosure in a vertical orientation, the height of the storage chassis can be reduced, for example from 4U to 2U and therefore provide increased data storage density in a smaller height profile without sacrificing thermal performance or service accessibility.

FIG. 1A is a schematic diagram of an exemplary storage architecture 100 according to aspects of the present disclosure. The storage architecture 100 includes a storage system 102, and while the storage system 102 is referred to as a singular entity, it may include any number of computing devices and may range from a single computing system to a system cluster of any size. Accordingly, in the illustrated embodiment, the storage system 102 includes at least one computing system, which in turn includes a processor such as a microcontroller or a central processing unit (CPU) operable to perform various computing instructions. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

The storage system 102 includes one or more storage controllers 104 communicatively coupled to one or more storage devices 106. In various examples, the storage devices 106 include hard disk drives (HDDs), solid state drives (SSDs), optical drives, and/or any other suitable volatile or non-volatile data storage medium. It is understood that for clarity and ease of explanation, only a limited number of storage controllers 104 and storage devices 106 are illustrated, although the storage system 102 may include any number of storage devices 106 coupled to any number of storage controllers 104.

The storage system 102 may group the storage devices 106 for speed and/or redundancy using a virtualization technique such as RAID (Redundant Array of Independent/Inexpensive Disks) or a dynamic disk pool. The storage system may also arrange the storage devices 106 hierarchically for improved performance by including a large pool of relatively slow storage devices and one or more caches (i.e., smaller memory pools typically utilizing faster storage media). Portions of the address space may be mapped to the cache so that transactions directed to mapped addresses can be serviced using the cache. Accordingly, the larger and slower memory pool is accessed less frequently and in the background. In an embodiment, a storage device includes HDDs, while an associated cache includes SSDs, to name just one example.

The storage controllers 104 exercise low-level control over the storage devices 106 in order to execute (perform) data transactions on behalf of the storage system 102 and may also perform data transactions on behalf of other computing systems such as network-attached hosts. The storage controllers 104 provide an interface for communicating with the storage devices 106, and in that regard, may conform to any suitable hardware and/or software protocol. In various embodiments, the storage controllers 104 include Serial Attached SCSI (SAS), iSCSI, InfiniBand, Fibre Channel, and/or Fibre Channel over Ethernet (FCoE) controllers. Other suitable protocols include SATA, eSATA, PATA, USB, and FireWire. The physical connection between the storage controllers 104 and the connected storage devices may depend in part on the communication protocol and may take the form of a direct connection (e.g., a single wire or other point-to-point connection), a networked connection, or any combination thereof. Thus, in some embodiments, a storage controller 104 is communicatively coupled to a storage device 106 over a network, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. For redundancy, a single storage device 106 may be coupled to more than one storage controller 104.

Data transactions are often categorized as either block-level or file-level. Block-level protocols designate data locations using an address within the aggregate of storage devices 106. Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for embodiments where data transactions are received over a network that includes the Internet, a Wide Area Network (WAN), and/or a Local Area Network (LAN). Fibre Channel and FCoE are well suited for embodiments where hosts 104 are coupled to the storage system 102 via a direct connection. A Storage Attached Network (SAN) device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CFIS, SAMBA, and NFS. A Network Attached Storage (NAS) device is a type of storage system that responds to file-level transactions. It is understood that the scope of the present disclosure is not limited to either block-level or file-level protocols, and in many embodiments, the storage system 102 is responsive to a number of different memory transaction protocols.

Figure 1C:
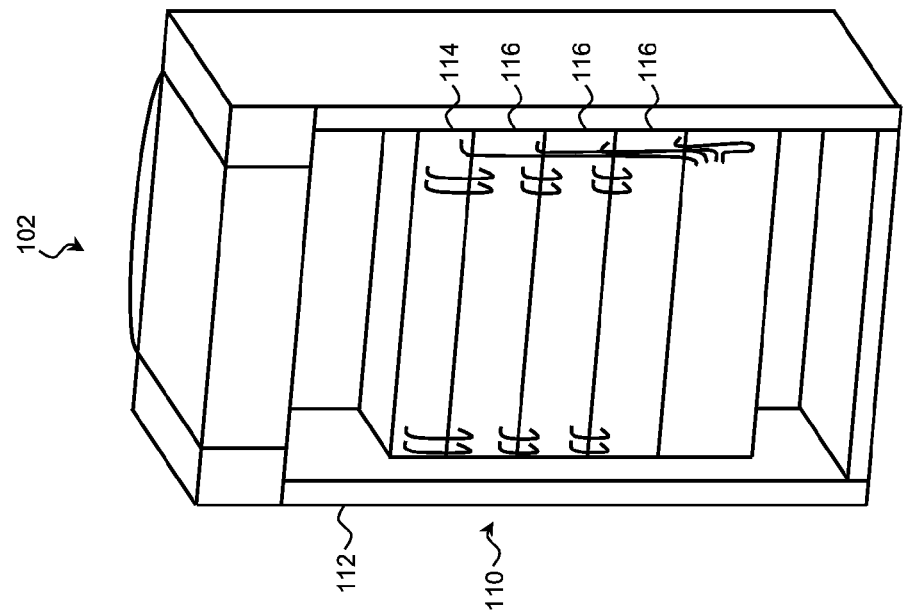
FIG. 1C is a perspective diagram of an exemplary storage system according to aspects of the present disclosure.
Figure 1B:
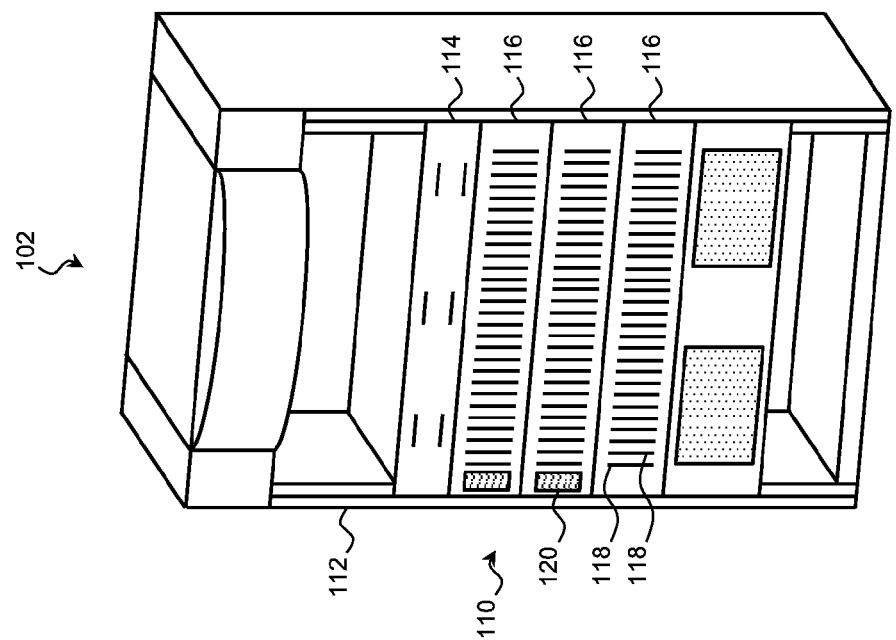
FIG. 1B is a perspective diagram of an exemplary storage system according to aspects of the present disclosure.

FIGS. 1B and 1C are perspective diagrams of a storage system 102 according to aspects of the present disclosure. The illustrated storage system 102 has a modular arrangement, which delivers flexibility and performance in a small footprint by incorporating interconnected computing modules 110 housed within one or more standardized enclosures 112. Customers can expand capacity by adding additional modules 110, often within the same enclosure 112. The enclosure 112 provides physical support and may provide routing channels, cable management, power, and/or cooling for the modules 110. The enclosure 112 may take any suitable form including a rack enclosure, a tower enclosure, a blade enclosure, and/or other suitable enclosure. The illustrated embodiments of FIGS. 1B and 1C may be referred to as a rack-mounted storage system 102. Other embodiments include other physical arrangements including tower and blade arrangements.

In the illustrated embodiment, the modular storage system 102 includes a storage controller module 114 having one or more storage controllers 104 such as those described in FIG. 1A. In this embodiment, the storage system 102 further includes a number of storage device modules 116, often referred to as "storage device shelves" or "disk shelves." The disk shelves 116 contain bays 118 that hold storage devices 106 and communicatively couple the storage devices 106 to the storage system 102. Accordingly, an exemplary bay 118 includes rails for receiving a storage device 106, or multiple storage devices on a tray as will be discussed in more detail below, and contacts for electrically coupling the storage device to the disk shelf 116. In other examples, the bay 118 only provides physical support and connections are made by wiring the storage device 106 to the disk shelf 116. The bays 118 may be numbered for reference, and for a multiple-drive bay 118 that is capable of holding more than one storage device 106, each position within the bay 118 may also be numbered for reference. In addition to bays 118, disk shelves 116 may include a display 120, such as an LCD, LED, or other suitable user display, for providing information about the disk shelf 116. In alternative embodiments, the display 120 is not included.

The disk shelves 116 may reduce wiring clutter and wiring errors by interconnecting the contained storage devices 106. In some embodiments where communication busses between storage devices 106 are integrated into the disk shelves 116, cabling is reduced to merely connecting the disk shelves 116 to storage controller 104 ports on the storage controller module 114. In some embodiments, disk shelves 116 may be daisy chained (i.e., connected to a controller module 114 via another disk shelf 116) to increase the number of disk shelves 116 connected to a given storage controller port and to further reduce wiring complexity.

In an alternative embodiment, the storage controllers 104 and disk shelves 116 may be combined into single enclosures, e.g. each disk shelf 116 may include both bays 118 as well as one or more storage controllers 114. In this embodiment, a separate storage controller 114 may remain and provide control functionality to the disk shelves 116, or some subset thereof, in the enclosure 112.

The illustrated arrangement is merely one example of a storage system 102. In particular, enclosure 112 is an example of any enclosure that may house computing hardware, and disk shelves 116 are examples of sub-enclosures that may be arranged within enclosure 112 in an orderly manner. In many respects, this division of the storage system 102 into a physical hierarchy of enclosure (e.g., enclosure 112), sub-enclosures (e.g., disk shelves 116), and sub-sub-enclosures (e.g., bays 118) is merely for convenience of explanation. The concepts described herein apply equally to any compatible physical configuration.

Figure 2:
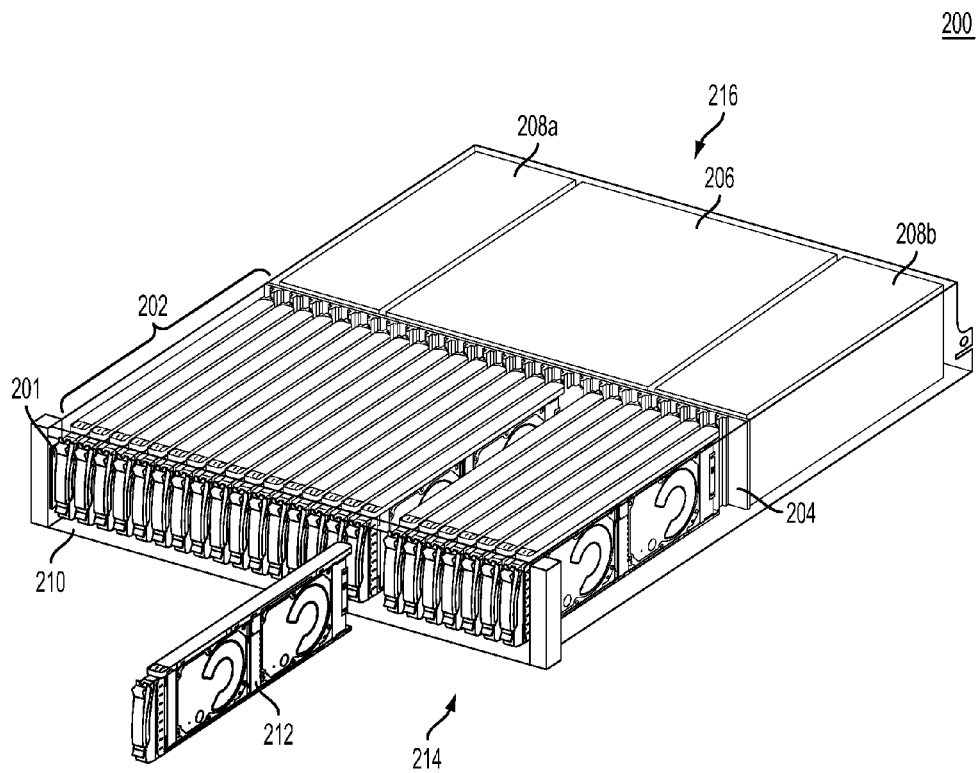
FIG. 2 is a schematic diagram of a cross-sectional front perspective view of an exemplary storage system architecture according to aspects of the present disclosure.

FIG. 2 is a schematic diagram of a cross-sectional front perspective view of an exemplary storage system architecture 200 according to aspects of the present disclosure. In an embodiment, the storage system architecture 200 is an example of a disk shelf 116 (sometimes referred to as a storage shelf as well) that is located in enclosure 112 as described with respect to FIGS. 1B and 1C above. The storage system architecture 200 includes a storage device enclosure 202, a midplane 204, input/output modules 206, power supplies 208a and 208b, front bezel 210, field replaceable units (FRUs) 212, proximal end 214, and distal end 216.

The storage system architecture 200 has a first length (width) along a horizontal axis of the storage system architecture 200, a second length (height) along a vertical axis of the storage system architecture 200, and a third length (depth) along a transverse axis from the proximal end 214 to the distal end 216. As illustrated in FIG. 2, the first length along the horizontal axis is greater than the second length. In an embodiment, the first and third lengths are in accordance with given standards, e.g. sized so that the storage system architecture 200 may fit within a standard server rack. As illustrated in FIG. 2, the first length along the horizontal axis is greater than the second length along the vertical axis. In an embodiment, the vertical dimension is 2U in height—or, in other words, 3.5 inches.

The storage device enclosure 202 is located at the proximal end 214 of the storage system architecture 200 and similarly has a greater width along the horizontal axis than height along the vertical axis. The storage device enclosure 202 includes tracks to receive a plurality of FRUs 212 and has a depth extending from the proximal end 214 to the midplane 204 in order to house the plurality of FRUs 212. The storage device enclosure 202 is designed to receive each FRU 212 in a vertical orientation so that the width of each FRU 212 extends along an axis parallel to the vertical axis of the storage system architecture 200. As a result, the height of each FRU 212 extends along the horizontal axis of the storage system architecture 200 so that a dense number of FRUs 212 may be inserted parallel to each other in the storage device enclosure 202.

The storage system architecture 200 further includes the power supplies 208a/208b. In an embodiment, each power supply 208a/208b has the wattage capacity to provide sufficient total power to all of the components of the storage system architecture 200 should the other power supply fail. Thus, the power supplies 208a/208b may provide full power redundancy against the risk of failure of either one, so that the storage system architecture 200 may continue operation uninterrupted during the failure and replacement. In an alternative embodiment, each power supply 208a/208b may have sufficient wattage capacity to provide power to a given subset of the components of the storage system architecture 200, such that the failure of one would result in reduced operation or power down of the storage system architecture 200. In an example, each power supply 208a/208b may be hot swappable, tool-less removable, and rear accessible at the distal end 216. As will be recognized, more or fewer power supplies may be included in the storage system architecture 200 without departing from the scope of the present disclosure.

The storage system architecture 200 further includes the input/output modules 206. As can be seen in the perspective view of FIG. 4, the storage system architecture 200 may include multiple input/output modules 206 for redundancy. In the embodiment shown, the input/output modules 206 are situated one above the other and between the power supplies 208a/208b. The input/output modules 206 may provide full redundancy such that if one should fail, the other is capable of taking over input/output and any other necessary control operations for the storage devices in the storage system architecture 200. In an embodiment, the input/output modules 206 have functionality limited to input/output operations while another controller, for example the storage controller 114 illustrated in FIG. 1C and discussed above, may be located separately and have redundancy control over the storage devices in the FRUs 212, such as a RAID controller or disk pool controller. In other embodiments, the input/output modules 206 may include additional functionality so that they operate as controllers either alone or in cooperation with a separate controller(s).

Figure 3:
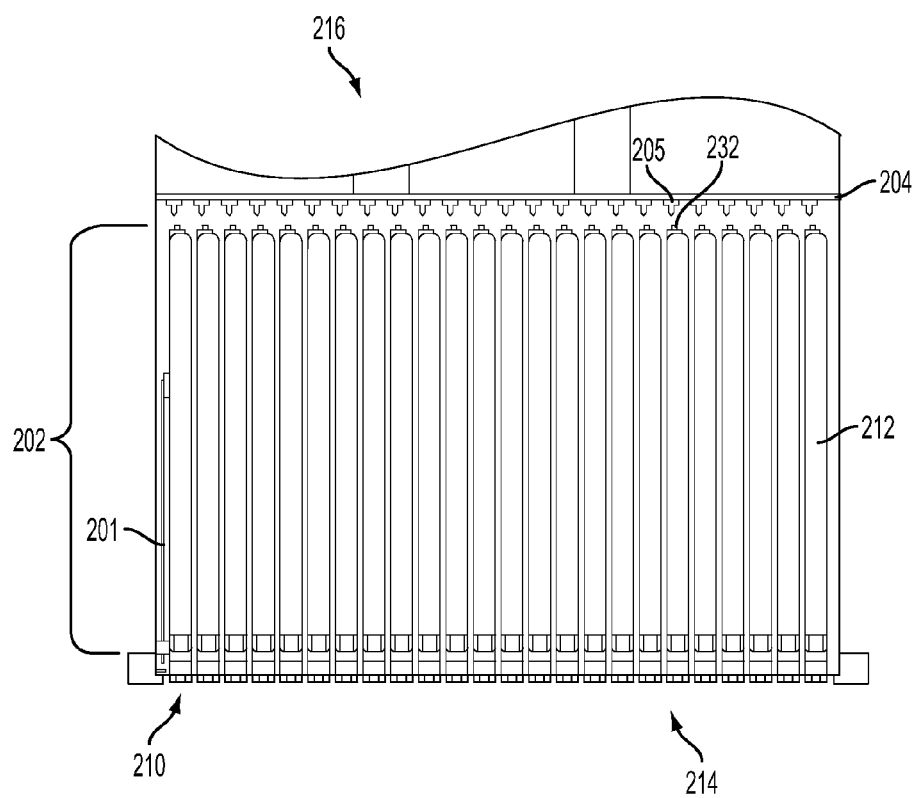
FIG. 3 is a schematic diagram of a top view of a section of an exemplary storage system architecture according to aspects of the present disclosure.

Returning to the plurality of FRUs 212, FIG. 3 is a schematic diagram of a top view of a section of the exemplary storage system architecture 200. The plurality of FRUs 212 have a depth that extends from the front bezel 210 at the proximal end 214 to the midplane 204. Each FRU 212 has connecting circuitry to couple the storage devices of each FRU 212 to the midplane 204, for example as illustrated in FIG. 3. The midplane 204 contains a plurality of corresponding slots or other type of connector 205 facing the proximal end 214. Each connector 205 is designed to couple to a corresponding connector 232 on each FRU 212, as illustrated in FIG. 3. Each connector 205 is placed in a vertical orientation as compared to the storage system architecture 200 in order to be able to couple to the FRU 212's connector 232. As a result, the midplane 204 may also be no more than 2U in height.

In an embodiment, the connector 205 and the connector 232 may be serial attached SCSI (SAS) connectors, although other protocols/standards may be used as will be recognized. The SAS connectors may operate according to current or future speeds, for example 6 Gbps or 12 Gbps to name just two examples. The midplane 204 also contains connections facing the distal end 216 that are designed to couple the storage devices of the FRUs 212 to the power supplies 208a and 208b as well as the input/output modules 206. The connections facing the distal end 216 may be placed in a horizontal orientation as compared to the storage system architecture 200 in order to couple with the power supplies and storage controllers.

In an embodiment, the midplane 204 does not have any active components so that there is reduced chance of failure of the midplane 204. Instead, active components may be placed with system elements that are less expensive to access and replace, such as on one or more circuit boards of the respective FRUs 212.

As shown in FIG. 3, the storage system architecture 200 may also include a bridge board 201 that may handle LED displays for various components of the system 200. For example, the bridge board 201 may include circuitry that processes and outputs data to the display 120 discussed above with respect to FIG. 1B. The bridge board 201 may receive information from one or more of the subsystems within the storage system architecture 200, for example one or more of the storage devices and/or FRUs 212, the midplane 204, the power supplies 208a/208b, and input/output modules 206. The information may include an indication of a failure (e.g., a storage device failure), processing or access, or other information relevant to the operation and maintenance of the storage system architecture 200 as will be recognized.

Figure 4:
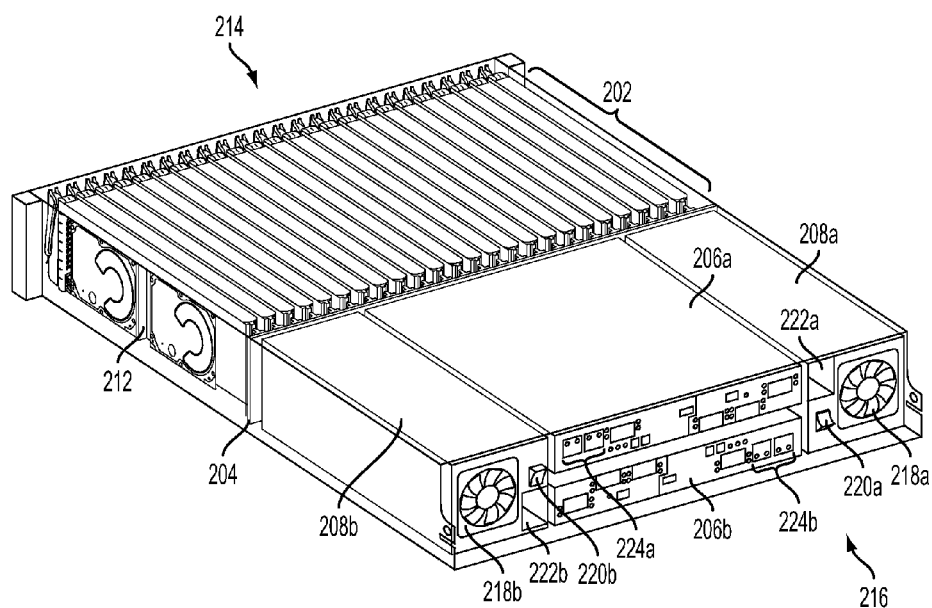
FIG. 4 is a schematic diagram of a cross-sectional rear perspective view of an exemplary storage system architecture according to aspects of the present disclosure.

Turning now to FIG. 4, a schematic diagram of a cross-sectional rear perspective view of the exemplary storage system architecture 200 is illustrated according to aspects of the present disclosure. As illustrated, at the distal end 216 of the storage system architecture 200 the power supply 208a includes the cooling fan 218a, power switch 220a, and power cable port 222a. The power supply 208b includes the cooling fan 218b, power switch 220b, and the power cable port 222b. In an embodiment, the one or more of the cooling fans 218a/218b may be centripetal blowers (also known as centrifugal fans). At the distal end 216 of the storage system architecture 200 the input/output module 206a includes networking ports 224a and the input/output module 206b includes networking ports 224b. The networking ports 224a/224b may be, for example, Ethernet interfaces or any other suitable wired or wireless communication interfaces that connect the input/output modules 206a/206b to other systems and/or each other.

Turning now to FIGS. 5-8, schematic diagrams of a storage tray architecture (specifically, FRU 212) are illustrated according to aspects of the present disclosure. The FRU 212 illustrated in FIGS. 5-8 may be demonstrative of the plurality of FRUs 212 and therefore will be discussed specifically for purposes of simplicity.

Figure 5:
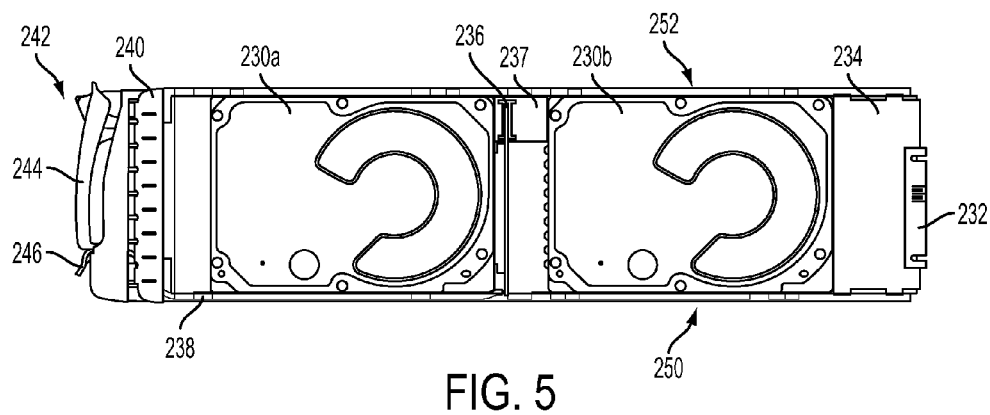
FIG. 5 is a schematic diagram of a side view of a top side of a storage tray architecture according to aspects of the present disclosure.

As illustrated in FIG. 5, the FRU 212 is configured to accommodate two storage devices 230a and 230b—storage device 230a is shown situated near the proximal end of the FRU 212 and the storage device 230b is shown situated near the distal end of the FRU 212. In an embodiment, the storage devices 230a and 230b are 2.5 inch storage devices, such as hard drives or solid state drives. Connector 232 is situated at the distal end of the FRU 212 and is configured to mate with the connector 205 at the midplane 204 as discussed above with respect to FIG. 3. Connector 232 is part of a bridge card 234 located at the distal end of the FRU 212.

The bridge card 234 may be a printed circuit board or an integrated circuit that includes active components that multiplex signals destined for either of storage devices 230a and 230b. For example, the bridge card 234 may include a multiplexer circuit that receives a signal from the connector 232 via the midplane 204 of the storage system architecture 200. The bridge card 234 causes the two storage devices 230a/230b to appear as a single storage device to the rest of the system. Once a signal is received at the bridge card 234 from the midplane 204, the bridge card 234's multiplexer may split the received signal according to whether it is directed towards the proximal storage device 230a or the distal storage device 230b (as viewed from the proximal end 214 while the FRU 212 is inserted within the storage device enclosure 202). In an embodiment, the multiplexer (or other circuit configured to perform an equivalent operation) of the bridge card 234 may split the signal based on a given address or range specified in the received signal, for example where the two storage devices 230a/230b of the FRU 212 have been assigned contiguous address ranges.

The storage device 230b may connect directly to a connector at the proximal side of the bridge card 234, and thereby receive signals directed towards the storage device 230b from the bridge card 234. The storage device 230a receives signals directed towards the storage device 230a via a flexible connector 237 and an interposer card 236. The flexible connector 237 may be a flexible harness, for example made from a polymer that encapsulates one or more thin conductors, that runs underneath the storage device 230b (e.g., between the base 248 and the storage device 230b) between the interposer card 236 and the bridge card 234. For example, the flexible connector 237 may be a flexible PCB with traces and contacts in the appropriate locations to convey signals, or a ribbon cable, or other form of flexible line that can convey signals between the bridge card 234 and the interposer card 236. The flexible connector 237 is thin in order to enable the storage device 230b to still fit within the pitch between FRUs 212 in the storage system architecture 200, since space is limited within the server rack horizontal dimension and, according to embodiments of the present disclosure, 24 FRUs 212 may be accommodated in a storage device enclosure 202 (resulting in a total of 48 storage devices in a smaller form factor—2U—without sacrificing thermal performance or service accessibility). It is still necessary to allow for airflow between FRUs 212 and the rest of the system, and other materials such as a rigid PCB for the connector 237 would take up too much space in the smaller dimensions available. Signals are transmitted to and from the storage device 230a via the flexible connector 237.

The interposer card 236 may be a printed circuit board or an integrated circuit that includes one or more circuits that analyze signal quality and boost signals, for example by way of amplifiers. The interposer card 236 is situated in a plane transverse to the base 248 (FIG. 7) of the FRU 212. In this configuration, the storage device 230a may connect to a connector on the interposer card 236 to transmit and receive signals. In operation, when the interposer card 236 receives a signal from the bridge card 234 via the flexible connector 237, the interposer card 236 determines whether the received signal has any signal quality and/or integrity issues after traversing the upstream path, for example attenuation based on the distance traveled. If the received signal has attenuated beyond a predetermined threshold, circuitry on the interposer card 236 (e.g., one or more amplifier chips) may boost or otherwise condition the signal and then pass on the boosted signal to the storage device 230a via a connector. Alternatively, the interposer card 236 may boost each signal that it receives.

The interposer card 236 may also have connected to it light pipes 238. As shown specifically in FIG. 6, light pipes 238 may include light pipe 238a and light pipe 238b. Each light pipe 238a/238b may be associated with a different function. For example, light pipe 238a may be used to identify whether the storage device 230a has entered a failure state or is operating at the moment, and light pipe 238b to identify whether the storage device 230b is operating or in a failure state, by way of example only. As will be recognized, more or fewer light pipes may be provided and/or used without departing from the scope of the present disclosure.

The FRU 212 also may include an electromagnetic interference (EMI) plate 240 for EMI shielding at the proximal end of the FRU 212. The EMI plate 240 may include one or more holes through which air may pass in order to assist in cooling the storage devices 230a/230b and other components.

Latching assembly 242 is located at the proximal end of the FRU 212 and includes handle 244 and latch 246. The handle 244 may provide a gripping location for a user as the FRU 212 is inserted into a respective location within the storage device enclosure 202. In one embodiment, the handle 244 may be in an "open" position during insertion (e.g., extending laterally away from the rest of the FRU 212) until inserted into the storage device enclosure 202, at which time the user may push the handle 244 inward until the latch 246 engages. Alternatively, the handle 244 may be "closed" during insertion, where the user pushes the FRU 212 via the handle 244 until the latch 246 engages with receiving members at the top and bottom sides of the storage device enclosure 202. To remove the FRU 212, a user may press the latch 246 in order to disengage one or more extending members from the receiving members. In an embodiment, pressing the latch 246 causes the handle 244 to release, allowing a user to pull the handle 244 outwards away from the rest of the FRU 212. This outward extension may release the FRU 212 from the storage device enclosure 202 and allow the user to pull the FRU 212 out for replacement or other operation.

Figure 7:
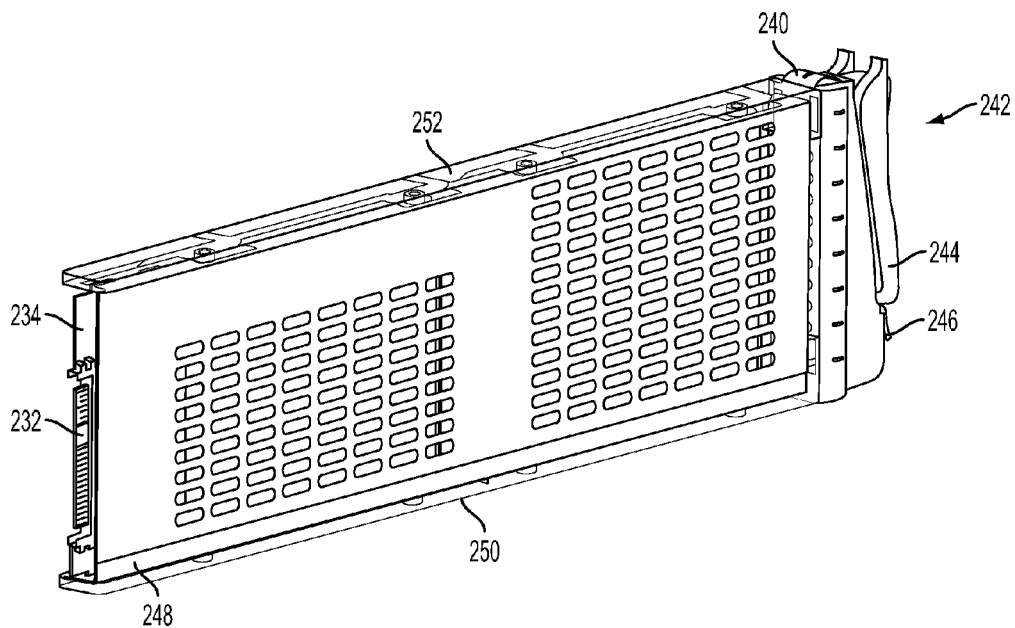
FIG. 7 is a schematic diagram of a rear perspective view of a bottom side of a storage tray architecture according to aspects of the present disclosure.

The base 248 of the FRU 212 may extend the full length of the FRU 212, as illustrated in FIG. 7, together with sides 250 and 252 provide support to the storage devices 230a/230b. The sides 250 and 252 may also include one or more engaging mechanisms that may assist in guiding the FRU 212 as it is inserted into or removed from the storage device enclosure 202. As further illustrated in FIG. 7, the base 248 may include one or more holes that allow the passage of air adjacent to the storage devices 230a/230b.

Figure 8:
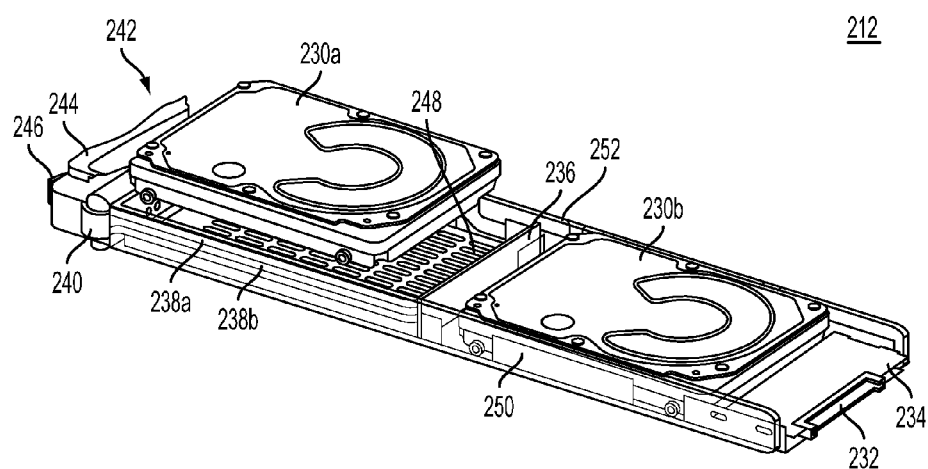
FIG. 8 is a schematic diagram of a partially exploded, perspective view of a side of a storage tray architecture according to aspects of the present disclosure.

FIG. 8 specifically illustrates a partially exploded, perspective view of a side of the FRU 212. Specifically, FIG. 8 illustrates the storage device 230a being removed from or inserted into the FRU 212. In an embodiment, each storage device 230a/230b may be toolless removable from the FRU 212, for example with a latch system or otherwise. Alternatively, the storage devices 230a/230b may be secured to the FRU 212 via one or more screws, for example inserted through the sides 250 and 252 into the sides of the storage devices 230a/230b as will be understood.

Figure 9:
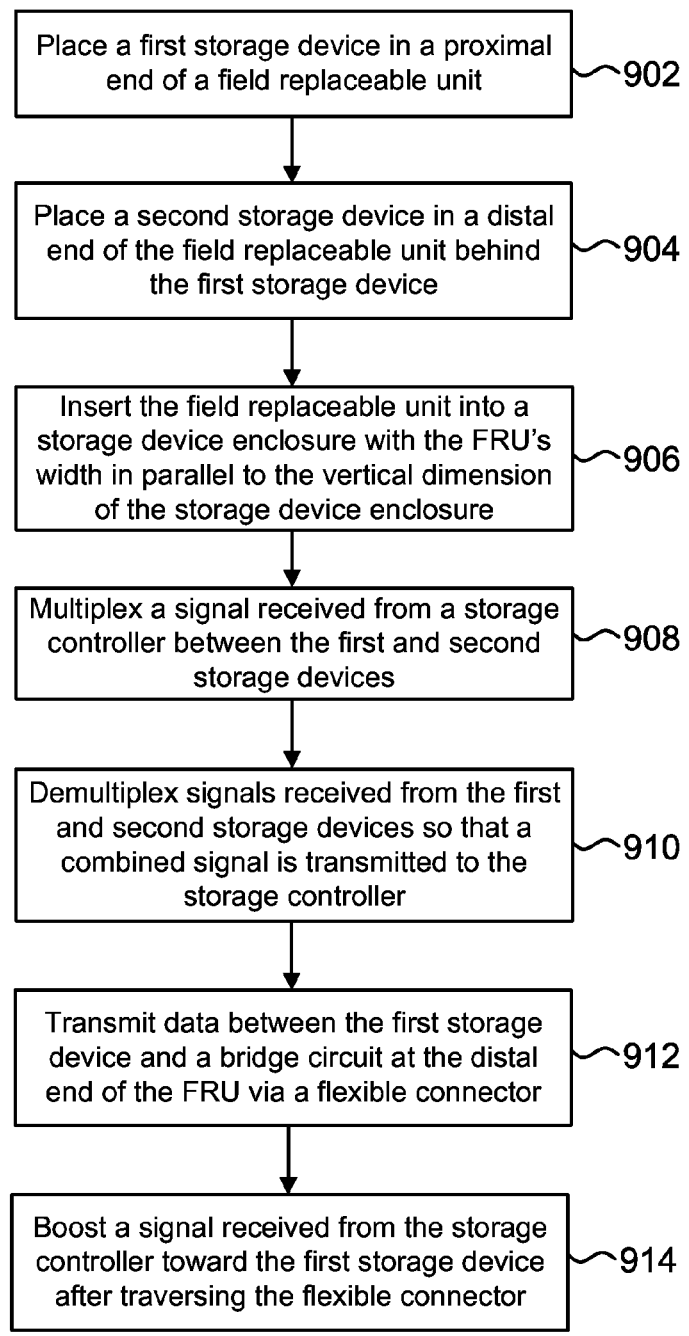
FIG. 9 is a flow diagram of a method according to aspects of the present disclosure.

Turning now to FIG. 9, a flow diagram of a method 900 is illustrated according to aspects of the present disclosure. The method 900 may be implemented using aspects of the storage system architecture 200. It is understood that additional steps can be provided before, during, and after the steps of method 900, and that some of the steps described can be replaced or eliminated for other embodiments of the method 900.

Figure 6:
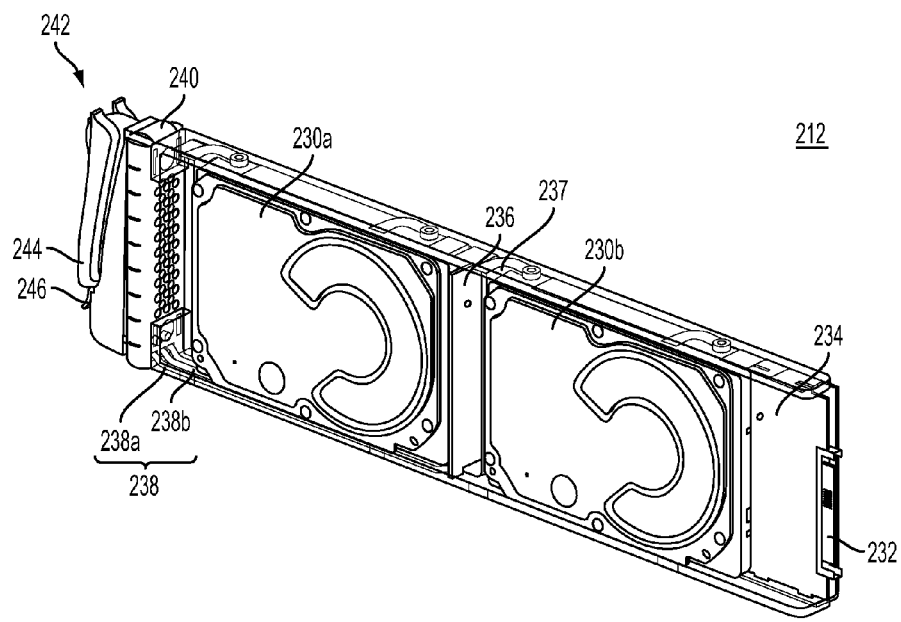
FIG. 6 is a schematic diagram of a rear perspective view of a top side of a storage tray architecture according to aspects of the present disclosure.

At step 902, a first storage device 230a is placed in a proximal end of a field replaceable unit 212, for example near the latching assembly 242 as shown in FIGS. 5, 6, and 8.

At step 904, a second storage device 230b is placed in a distal end of the FRU 212, for example near the bridge card 234 as shown in FIGS. 5, 6, and 8. According to embodiments of the present disclosure, one or both of the first and second storage devices 230a/230b can be toolless insertable/removable with the FRU 212, for example with a latch system or otherwise. Insertion of the first and second storage devices 230a/230b includes connection of the storage devices to connectors on the FRU 212 that communicate with the rest of a storage system architecture, for example the midplane 204 and thereby one or both of the storage controllers 206. For example, insertion of the first storage device 230a includes connecting the first storage device 230a to the interposer card 236 and insertion of the second storage device 230b includes connecting the second storage device 230b to the bridge card 234.

At step 906, the FRU 212 is placed into a storage device enclosure, for example storage device enclosure 202 as discussed above with respect to FIGS. 2-4. The FRU 212 is inserted into the storage device enclosure 202 in a vertical orientation so that a horizontal dimension of the FRU 212 is parallel with a vertical dimension of the storage device enclosure 202. As a result, the height of the FRU 212 extends along the horizontal axis of the storage system architecture 200 so that a dense number of FRUs 212 may be inserted parallel to each other in the storage device enclosure 202 while maintaining a minimum profile, e.g. a 2U height with a storage rack. Insertion of the FRU 212 is complete when the bridge card 234's connector 232 engages with the connector 205 of the midplane 204 sufficiently that signals may be exchanged between the two in operation.

At step 908, after the FRU 212 (and any other number of FRUs, e.g. 24 within a standard rack width) has been inserted into the storage device enclosure 202, the bridge card 234 multiplexes signals received from the storage controller(s) 206 between the first and second storage devices 230a/230b. For example, one or more active components on the bridge card 236 multiplex signals destined for either of storage devices 230a and 230b, so that the two storage devices 230a/230b to appear as a single storage device to the rest of the system. The multiplexing results in splitting the received signal according to whether it is directed towards the proximal storage device 230a or the distal storage device 230b (as viewed from the proximal end 214 while the FRU 212 is inserted within the storage device enclosure 202). In an embodiment, the multiplexer (or other circuit configured to perform an equivalent operation) of the bridge card 234 may split the signal based on a given address or range specified in the received signal, for example where the two storage devices 230a/230b of the FRU 212 have been assigned contiguous address ranges.

At step 910, the bridge card 234 demultiplexes signals received from the first and/or second storage devices 230a/

230b, resulting in a potentially combined signal that is transmitted to the storage controller 206. In an embodiment, the bridge card 234 may receive a signal from just one of the two storage devices 230a/230b, in which case the bridge card 234 may forward that signal on to the storage controller 206 as the combined signal. In other embodiments, both storage devices 230a/230b may have data to send in response to one or more I/O requests at approximately the same time, and the bridge card 234 may combine the signals.

At step 912, the data carried by the signals to and from the first storage device 230a (e.g., according to steps 908 and 910 above) are transmitted between the first storage device 230a and the bridge card 234 via a flexible connector 237. In an embodiment, the data is transmitted between the bridge card 234 and the interposer card 236 via the flexible connector 237. The flexible connector 237 has a smaller profile so that it may run underneath the second storage device 230b and still enable the FRU 212 to have a small vertical profile that results in a pitch between FRUs 212 sufficient to allow increased data storage density in a smaller height profile without sacrificing thermal performance or service accessibility.

At step 914, signals conveyed from the bridge card 234 toward the first storage device 230a via the flexible connector 237 are boosted. For example, the interposer card 236 may determine whether a received signal has any signal quality and/or integrity issues after traversing the upstream path, for example attenuation based on the distance traveled from the storage controller 206 to the interposer card 236. Circuitry on the interposer card 236 (e.g., one or more amplifier chips) may boost or otherwise condition the signal and then pass on the boosted signal to the storage device 230a. Alternatively, the interposer card 236 may boost each signal that it receives.

Thus, the present disclosure provides a system for housing an increased density of smaller storage devices in a reduced vertical profile without sacrificing thermal performance or service accessibility. In some embodiments, a storage system chassis is provided. The storage system chassis comprises a device enclosure comprising a vertical dimension and a horizontal dimension, wherein the horizontal dimension is greater than the vertical dimension. The storage system chassis also comprises a plurality of field-replaceable units (FRUs) each having a first length and a proximal end and a distal end along a longitudinal axis of the FRU, a second length along a horizontal axis transverse to the longitudinal axis, and a third length along a vertical axis, the plurality of FRUs each comprising a first storage device near the proximal end and a second storage device behind the first storage device near the distal end. The storage system chassis also comprises a storage controller configured to control operation of the storage devices of each of the plurality of FRUs. Each of the plurality of FRUs is situated with the second length in parallel with the device enclosure's vertical dimension within the device enclosure.

In further embodiments, field-replaceable unit is provided. The field-replaceable unit comprises a first length, a proximal end, and a distal end along a longitudinal axis of the field-replaceable unit. The field-replaceable unit also comprises a second length along a horizontal axis transverse to the longitudinal axis. The field-replaceable unit further comprises a third length along a vertical axis, the third length being less than the first and second lengths. The field-replaceable unit also comprises a first storage device near the proximal end and a second storage device behind the first storage device near the distal end, wherein the field-replaceable unit is situated within a storage system chassis so that the second length is in parallel with a vertical dimension of the storage system chassis.

In yet further embodiments, a storage system chassis comprises a device enclosure comprising a vertical dimension and a horizontal dimension, wherein the horizontal dimension is greater than the vertical dimension, and a plurality of slots situated along the horizontal dimension. The storage system chassis also comprises a plurality of field-replaceable units (FRUs), each having a first length and a proximal end and a distal end along a longitudinal axis of the FRU, a second length along a horizontal axis transverse to the longitudinal axis, and a third length along a vertical axis, the plurality of FRUs each comprising a first storage device near the proximal end and a second storage device behind the first storage device near the distal end. The storage system chassis also comprises a storage controller configured to control operation of the storage devices of each of the plurality of FRUs, wherein each of the plurality of FRUs is situated with the second length in parallel with the vertical dimension within a respective slot of the device enclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A storage system chassis, comprising:
    a device enclosure comprising a vertical dimension and a horizontal dimension, wherein the horizontal dimension is greater than the vertical dimension;
    a plurality of field-replaceable units (FRUs) each having a first length and a proximal end and a distal end along a longitudinal axis of the FRU, a second length along a horizontal axis transverse to the longitudinal axis, and a third length along a vertical axis, the plurality of FRUs each comprising a first storage device near the proximal end and a second storage device behind the first storage device near the distal end; and
    a storage controller configured to control operation of the storage devices of each of the plurality of FRUs; and
    a bridge board configured to process and output data to a display at the proximal end of the plurality of FRUs,
    wherein each of the plurality of FRUs is situated with the second length in parallel with the device enclosure's vertical dimension within the device enclosure, and
    wherein each of the plurality of FRUs further comprises a bridge circuit at the distal end of the FRU configured to connect the first and second storage devices to the storage controller and a flexible connector having a first connection to the bridge circuit and a second connection to an interposer circuit located between the first and second storage devices, the flexible connector being configured to transmit data between the bridge circuit and the first storage device.

2. The storage system chassis of claim 1, wherein each of the plurality of FRUs further comprises:

a midplane circuit at the distal end configured to connect the first and second storage devices of each FRU to the storage controller.

3. The storage system chassis of claim 2, wherein the bridge circuit comprises:
 a multiplexing circuit configured to multiplex signals between the storage controller and the first and second storage devices so that the first and second storage devices appear as a single storage device to the storage controller.

4. The storage system chassis of claim 2, wherein the interposer circuit comprises:
 a circuit configured to boost attenuated signals from the storage controller directed to the first storage device.

5. The storage system chassis of claim 1, wherein the second length of each of the plurality of FRUs is 2U.

6. The storage system chassis of claim 1, further comprising:
 a first power supply at a distal end of the device enclosure next to a first side of the device enclosure along the horizontal dimension; and
 a second power supply at the distal end of the device enclosure next to a second side of the device enclosure along the horizontal dimension,
 wherein the storage controller comprises a first storage controller and a second controller between the first and second power supplies at the distal end of the device enclosure, the first storage controller being below the second storage controller.

7. A field-replaceable unit, comprising:
 a first length, a proximal end, and a distal end along a longitudinal axis of the field-replaceable unit;
 a second length along a horizontal axis transverse to the longitudinal axis;
 a third length along a vertical axis, the third length being less than the first and second lengths;
 a first storage device near the proximal end and a second storage device behind the first storage device near the distal end, wherein the field-replaceable unit is situated within a storage system chassis so that the second length is in parallel with a vertical dimension of the storage system chassis of a storage controller;
 a bridge circuit at the distal end of the field replaceable unit configured to connect the first and second storage devices to a storage controller via a midplane in the storage system chassis;
 an interposer circuit between the first and second storage devices and configured to boost attenuated signals received from the storage controller directed to the first storage device; and
 a flexible connector having a first connection to the bridge circuit and a second connection to the interposer circuit, wherein the flexible connector is configured to transmit data between the bridge circuit and the first storage device,
 wherein the field-replaceable unit is configured to transmit data to a bridge board of the storage system chassis, the bridge board configured to process and output the data to a display of the storage system chassis at the proximal end of the field-replaceable unit.

8. The field-replaceable unit of claim 7, wherein the bridge circuit comprises:
 a multiplexing circuit configured to multiplex signals between the storage controller and the first and second storage devices so that the first and second storage devices appear as a single storage device to the storage controller.

9. The field-replaceable unit of claim 7, further comprising:
 the flexible connector having the first connection to the bridge circuit and the second connection to the interposer circuit, wherein the flexible connector is configured to transmit data between the bridge circuit and the first storage device.

10. The field-replaceable unit of claim 7, further comprising:
 a light pipe connected between the interposer circuit and a front face of at the proximal end and configured to convey light corresponding to a storage device status of one or both of the first and second storage devices.

11. The field-replaceable unit of claim 7, wherein the second length of the field replaceable unit is 2U.

12. The field-replaceable unit of claim 7, wherein the first and second storage devices are toolless removable from the field-replaceable unit.

13. A method comprising:
 placing a first storage device in a proximal end of a field replaceable unit (FRU), the field replaceable unit having a first length and the proximal end and a distal end along a longitudinal axis of the FRU, a second length along a horizontal axis transverse to the longitudinal axis, and a third length along a vertical axis;
 placing a second storage device in a distal end of the FRU behind the first storage device;
 inserting the FRU, with the second length in parallel with a device enclosure's vertical dimension, into a receiving track of the device enclosure, wherein the device enclosure comprises the vertical dimension and the horizontal dimension and the horizontal dimension is greater than the vertical dimension;
 transmitting data between the first storage device and a bridge circuit at the distal end of the FRU by a flexible connector connected between the bridge circuit and an interposer circuit between the first and second storage devices;
 boosting a signal received from a storage controller via the bridge circuit and flexible connector; and
 outputting, via a display at the proximal end of the FRU, data processed and output to the display by a bridge board.

14. The method of claim 13, further comprising:
 multiplexing, at the bridge circuit located at the distal end of the FRU, the signal received from the storage controller to one or more of the first and second storage devices so that the first and second storage devices appear as a single storage device to the storage controller; and
 demultiplexing, at the bridge circuit, signals received from the first and second storage devices so that a combined signal is transmitted from the field replaceable unit to the storage controller.

15. The method of claim 13, wherein the second length of the FRU is 2U.

* * * * *